United States Patent
Fishman et al.

(10) Patent No.: US 8,460,629 B2
(45) Date of Patent: Jun. 11, 2013

(54) PURIFICATION OF MATERIALS NON-ELECTRICALLY CONDUCTIVE IN THE SOLID STATE AND ELECTRICALLY CONDUCTIVE IN THE MOLTEN STATE WITH ELECTRIC INDUCTION POWER

(75) Inventors: Oleg S. Fishman, Maple Glen, PA (US); John H. Mortimer, Little Egg Harbor Township, NJ (US)

(73) Assignee: Inductotherm Corp., Rancocas, NJ (US)

( * ) Notice: Subject to any disclaimer, the term of this patent is extended or adjusted under 35 U.S.C. 154(b) by 765 days.

(21) Appl. No.: 12/626,194

(22) Filed: Nov. 25, 2009

(65) Prior Publication Data

US 2010/0135889 A1 Jun. 3, 2010

Related U.S. Application Data

(60) Provisional application No. 61/118,775, filed on Dec. 1, 2008.

(51) Int. Cl.
*C01B 33/02* (2006.01)

(52) U.S. Cl.
USPC .......................................... 423/348

(58) Field of Classification Search
USPC .................................. 423/348–350
See application file for complete search history.

(56) References Cited

U.S. PATENT DOCUMENTS

| | | | |
|---|---|---|---|
| 4,094,731 A | 6/1978 | Keyser et al. | |
| 4,900,532 A | 2/1990 | Kurz et al. | |
| 6,036,932 A | 3/2000 | Hongu et al. | |
| 6,798,821 B2 | 9/2004 | Lian et al. | |
| 6,993,061 B2 * | 1/2006 | Roach et al. | 373/146 |
| 7,497,986 B2 * | 3/2009 | Bewlay et al. | 266/201 |
| 7,682,472 B2 * | 3/2010 | Kaneko | 148/538 |
| 2005/0139148 A1 | 6/2005 | Fujiwara et al. | |
| 2006/0042725 A1 * | 3/2006 | Bewlay et al. | 148/237 |
| 2007/0081572 A1 * | 4/2007 | Fishman et al. | 373/142 |

FOREIGN PATENT DOCUMENTS

| | | |
|---|---|---|
| CA | 2227693 C | 7/2001 |
| KR | 10-0275973 B1 | 12/2000 |

* cited by examiner

*Primary Examiner* — Colleen Dunn
(74) *Attorney, Agent, or Firm* — Philip O. Post

(57) ABSTRACT

The present invention is apparatus for, and method of, heating, melting and purifying a material by electric induction heating in a susceptor furnace. Non-electrically conductive solid charge may initially be placed in the furnace. Output frequency from a power source supplying current to one or more induction coils surrounding the furnace is selected to maximize magnetic coupling with the susceptor material in the susceptor furnace to induce eddy current heating in the material. Heat transfers by conduction from the susceptor material to the non-electrically conductive charge placed in the susceptor furnace to melt the charge. Output frequency is reduced as the charge melts and becomes electrically conductive to enhance magnetic coupling with the melt in the furnace. Degassing of impurities from the melt can be achieved by bubbling a gas through the melt while the surface level of the melt is maintained at vacuum. Degassing is enhanced by creating an electromagnetic ripple/wave action that increases the surface area of the melt during the degassing process.

9 Claims, 3 Drawing Sheets

PURIFICATION OF MATERIALS NON-ELECTRICALLY CONDUCTIVE IN THE SOLID STATE AND ELECTRICALLY CONDUCTIVE IN THE MOLTEN STATE WITH ELECTRIC INDUCTION POWER

CROSS REFERENCE TO RELATED APPLICATIONS

This application claims the benefit of U.S. Provisional Application No. 61/118,775, filed Dec. 1, 2008, hereby incorporated by reference in its entirety.

FIELD OF THE INVENTION

The present invention relates to purification by reactive degasification of materials that are essentially non-electrically conductive in the solid state, and electrically conductive in the liquid, or molten, state wherein the heating and melting process utilizes electric induction power.

BACKGROUND OF THE INVENTION

Silicon is one example of a composition that is essentially non-electrically conductive in the solid state and electrically conductive in the liquid (molten) state. For example the electrical (specific) conductivity, $\kappa$, of pure (semiconductor grade) silicon can be expressed mathematically as:

$$\log(\kappa) = \left(4.247 - \left(\frac{2924}{T}\right)\right) \quad [\text{Eq. (1)}]$$

where $\kappa$ is measured in siemens per meter and the temperature of the silicon, T, is measured in kelvin. Therefore pure silicon is generally considered an electrical insulator at less than 700 kelvin (427° C.) and an electrical conductor at a much higher temperature that is above its nominal melting temperature of 1683 kelvin (1410° C.).

Electric induction power can be used with susceptor furnaces to heat and melt materials that are supplied as charge to the furnace when the charge is in the substantially solid, non-electrically conductive state, and electrically conductive in the liquid (or molten) state.

It is one object of the present invention to provide apparatus and method for heating and melting a material that is essentially non-electrically conductive in the solid state, and electrically conductive in the liquid (or molten) state by electric induction power while enhancing rapid removals of impurities from the material by reactive degasification of the material when it is in the molten state.

BRIEF SUMMARY OF THE INVENTION

In one aspect the present invention is apparatus for, and method of, heating, melting and purifying a material by electric induction heating in a susceptor furnace. Non-electrically conductive solid charge may initially be placed in the furnace. Output frequency from a power source supplying current to one or more induction coils surrounding the furnace is selected to maximize magnetic coupling with the susceptor material in the susceptor furnace to induce eddy current heating in the material. Heat transfers by conduction from the susceptor material to the non-electrically conductive charge placed in the susceptor furnace to melt the charge. Output frequency is reduced as the charge melts and becomes electrically conductive to enhance magnetic coupling with the melt in the furnace. Degassing of impurities from the melt can be achieved by bubbling a gas through the melt while the surface level of the melt is maintained at vacuum. Degassing is enhanced by creating an electromagnetic ripple/wave action that increases the surface area of the melt during the degassing process.

In another aspect the present invention is a method of melting and purifying a composition that is non-electrically conductive in the solid state, and electrically conductive in the molten state. A charge of the solid state composition is deposited in a crucible at least partially lined with a susceptor material. The charge of the solid state composition is melted initially by inductive heating of the susceptor material from a susceptor heating magnetic flux established by the flow of a susceptor heating high frequency current in one or more induction coils. The induction coils surround the exterior height of the crucible at least from the fill height of the crucible to at least 25 percent below the susceptor material in the bottom of the crucible. Subsequent to forming molten material in the crucible, a molten material heating magnetic flux is established by the flow of a molten material heating low frequency current in the one or more induction coils to form a molten mass of the material in the crucible that fills at least a cylindrical volume having a diameter to height ratio of at least 8 to 1. The molten mass is then contained in a vacuum environment while one or more reaction (purification) gases are supplied to the bottom of the molten mass of material for reaction with one or more impurities in the molten mass so that the gas-reacted impurities can be extracted from the vacuum environment.

In another aspect the present invention is an induction furnace for melting and purifying a composition that is non-electrically conductive in the solid state, and electrically conductive in the molten state. A crucible has a cylindrically shaped interior volume at least partially lined around the crucible's interior wall and bottom with a susceptor material. The ratio of the diameter of the interior volume to the fill height of the interior volume of the susceptor lined crucible is at least 8 to 1. At least one gas inlet penetrates into the bottom of the crucible. At least one gas dispersal element is disposed in the bottom of the interior volume of the crucible for dispersal of one or more gases flowing through the gas inlets. At least one induction coil surrounds the exterior height of the crucible from at least the fill height to at least 25 percent below the susceptor material in the crucible's bottom. The output of at least one alternating current power source is connected to the at least one induction coil. A sealing structure, such as a lid or vacuum chamber, is provided for establishing a vacuum environment over the surface of the material in the interior volume of the susceptor lined crucible. A frequency controller is provided for adjusting the heating frequency of the output current from at least a susceptor heating high frequency for magnetic flux coupling with the susceptor material to a molten material heating low frequency for magnetic flux coupling into the interior volume of the crucible, and/or modulating a low frequency of the output current from at least between zero and 2 Hertz.

The above and other aspects of the invention are set forth in this specification and the appended claims.

BRIEF DESCRIPTION OF THE DRAWINGS

The foregoing brief summary, as well as the following detailed description of the invention, is better understood when read in conjunction with the appended drawings. For the purpose of illustrating the invention, there is shown in the drawings exemplary forms of the invention that are presently preferred; however, the invention is not limited to the specific arrangements and instrumentalities disclosed in the following appended drawings.

DETAILED DESCRIPTION OF THE INVENTION

Figure 1:
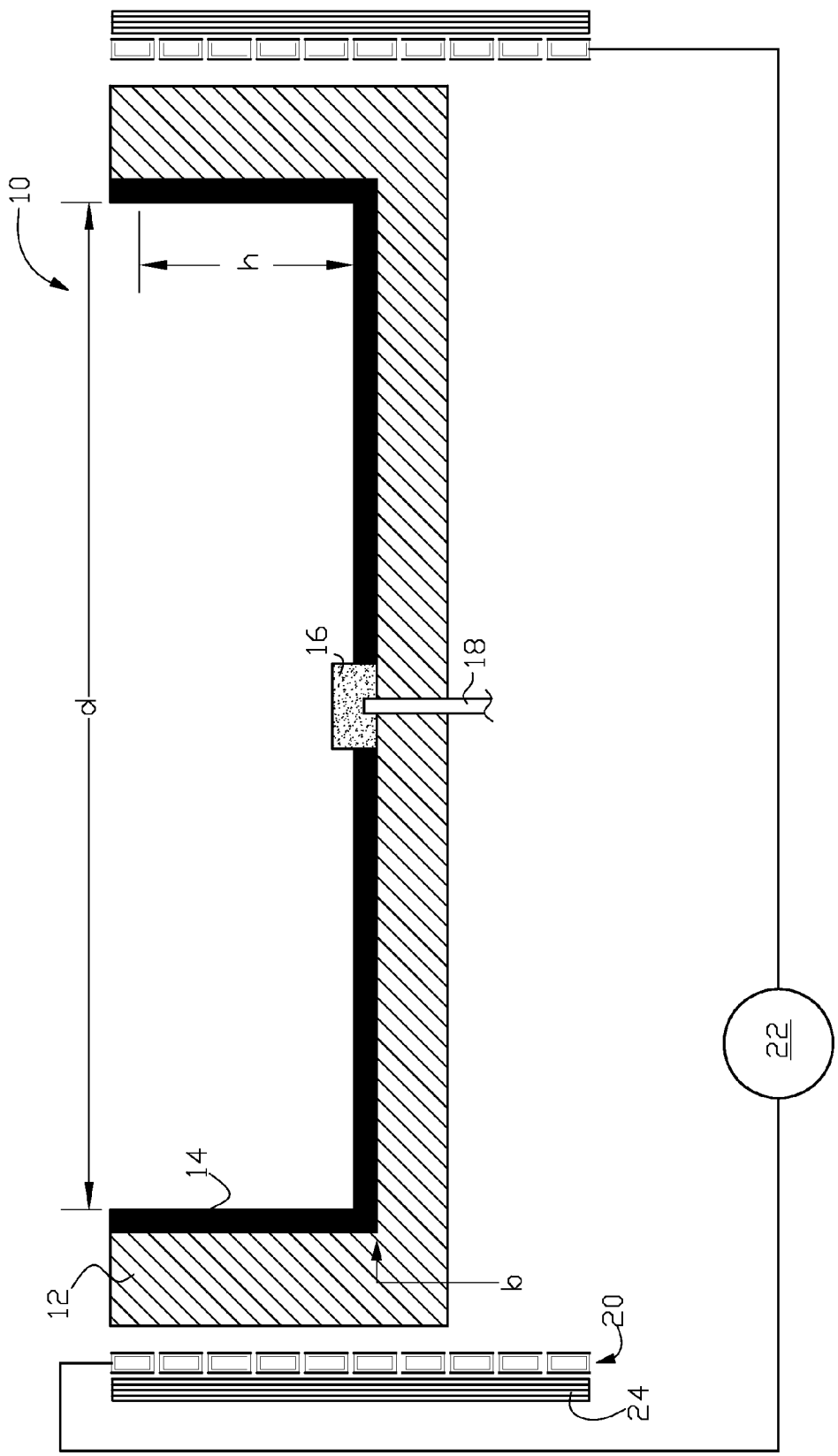
FIG. 1 is a cross sectional elevation view of one example of a susceptor furnace used in one example of the present invention.
Figure 2:
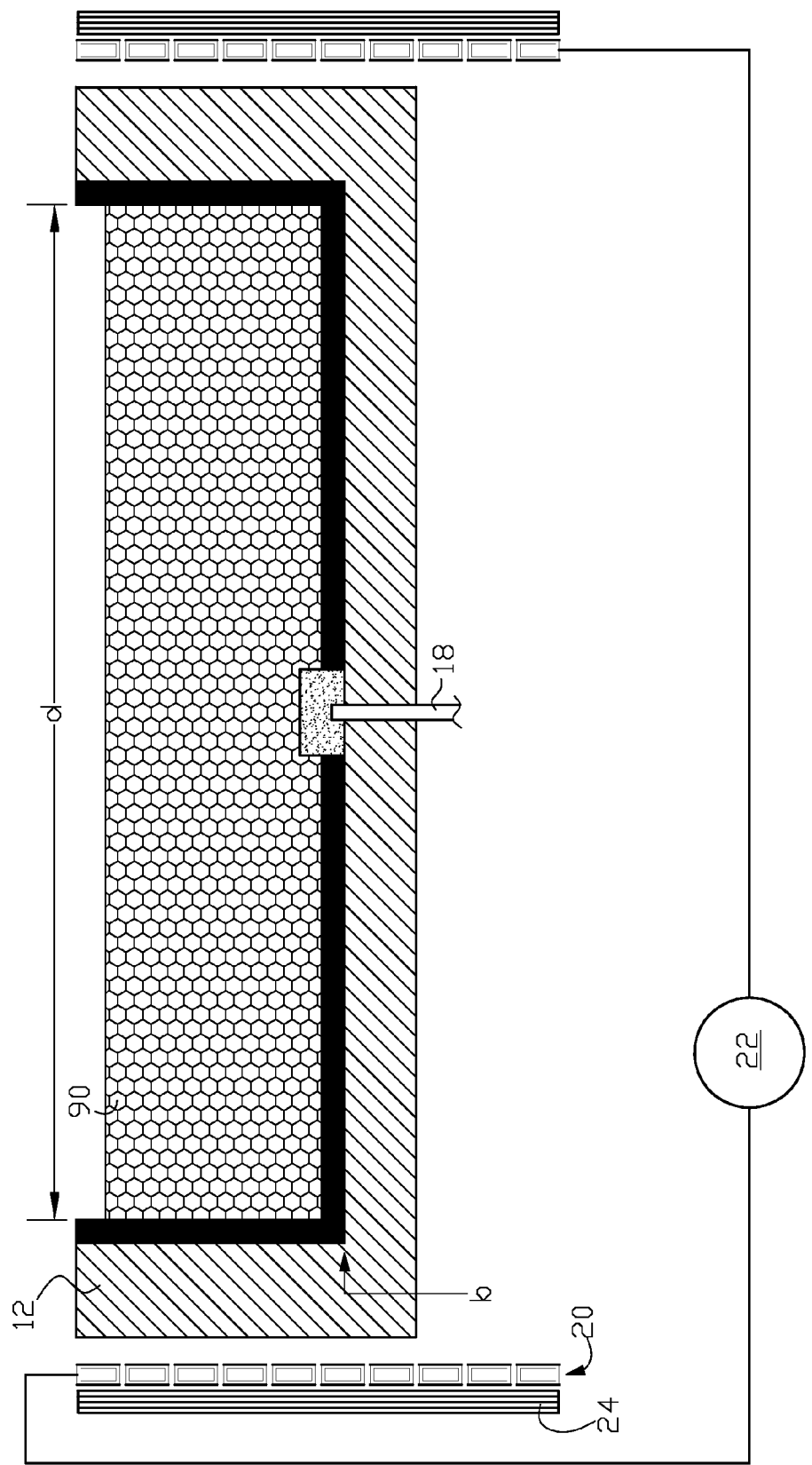
FIG. 2 is a cross sectional elevation view of the susceptor furnace shown in FIG. 1 when filled with solid non-electrically conductive charge.
Figure 3:
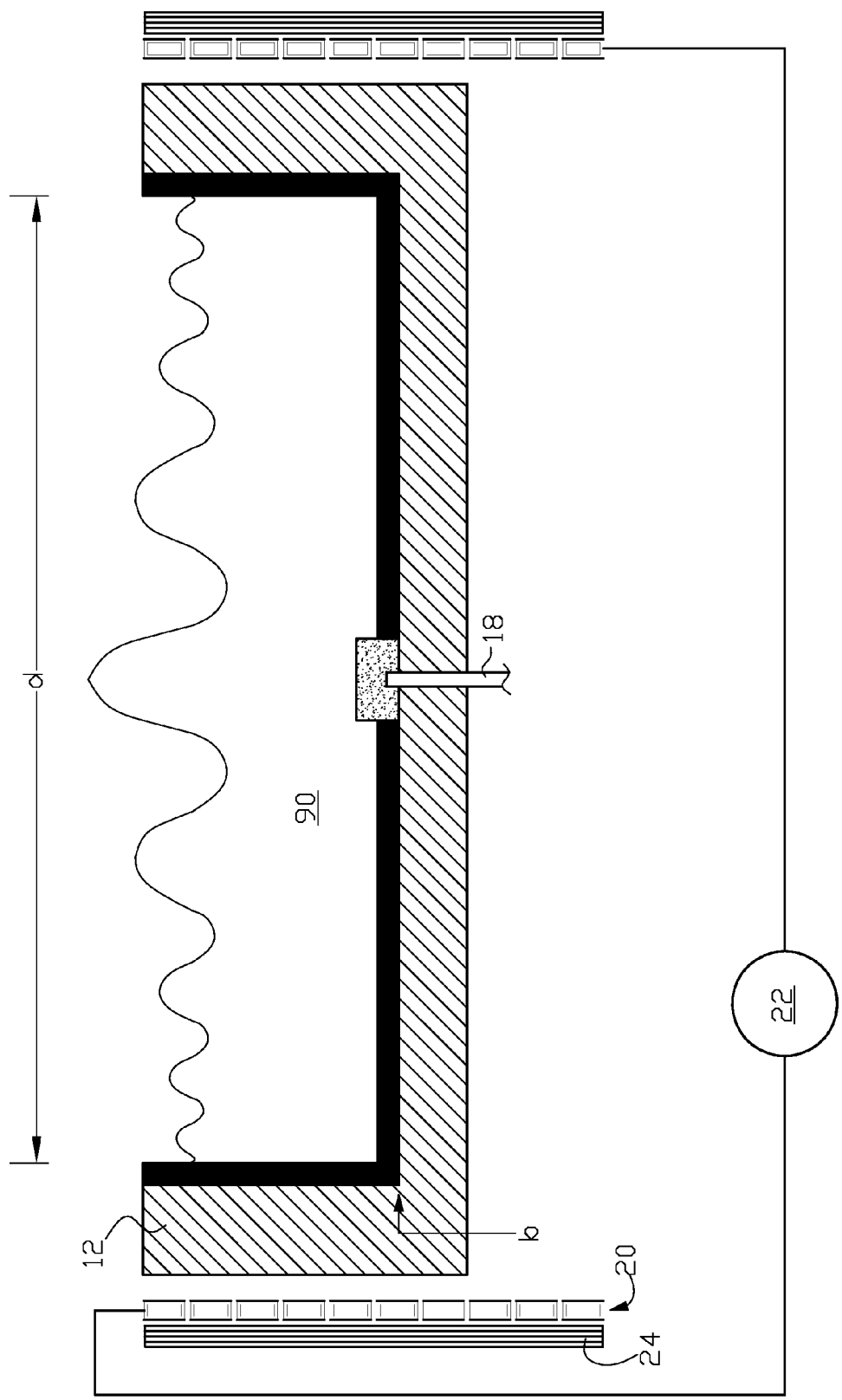
FIG. 3 is a cross sectional elevation view of the susceptor furnace shown in FIG. 1 when filled with molten electrically conductive material and wave action of the material is electromagnetically induced.

There is shown in FIG. 1 through FIG. 3 susceptor furnace system 10 used in one example of the present invention. Suitable crucible or refractory 12 is lined with susceptor 14, which can be of a graphite composition, or other suitable susceptor material. To prevent introducing susceptor material impurities into the material placed in the furnace, the inner surface of the susceptor can be treated to form a suitable boundary between the material and the susceptor, or the inner surface of the susceptor can be lined with a suitable boundary material such as silica. In some examples of the invention, the interior volume of the furnace is selected so that if the interior volume of the furnace is generally in the shape of a cylinder, the ratio of the diameter of the interior, d, to the fill height, h, is at least 8-to-1 (8:1), where the fill height is defined as the nominal full capacity of the furnace with completely molten material. For example if the interior fill height of the furnace is approximately 1.0 meter, then the interior diameter will be at least approximately 8.0 meters. Alternatively if the shape of the interior volume of the furnace is other than cylindrical, the interior volume of the furnace should be at least sufficiently sized to contain a cylindrical molten mass of material that has a diameter to height ratio of at least 8-to-1 (8:1). In other examples of the invention the interior of the refractory is only partially lined with one or more discrete susceptors arranged to provide sufficient initial melting of the non-electrically conductive material by heat conducted from the inductively heated one or more discrete susceptors.

Porous material 16, which serves as a gas dispersing element for gas into molten material in the furnace, is located in a bottom region of the furnace so that a gas, such as air, a noble gas, or combination of gases, can be injected into the porous material through gas conduit 18, and then percolate into the interior volume of the furnace as further described below. Multiple discrete gas dispersing elements or a continuous gas dispersing element may be located along the bottom surface of the furnace.

One or more induction coils 20 surround the exterior height of the furnace and preferably extend at least 25 percent below the bottom surface, b, of the bottom region of susceptor 14 so that when alternating current (ac) current is supplied from a suitable power supply 22 to the one or more induction coils, the generated magnetic flux extends more towards the bottom central region of the furnace than that achievable without the extension of the coil height. Electromagnetic shunts 24 may be placed around the exterior of the one or more induction coils to direct flux fields towards the interior of the furnace.

In operation non-electrically conductive charge 90 of the material, for example, metallurgical grade silicon, can be loaded into the interior of the furnace as shown in FIG. 2, or can be added to existing molten material in a partially filled furnace.

Power source 22 is energized and alternating current is supplied to the one or more induction coils 20. When there is only non-electrically conductive solid material in the furnace, output frequency, F, of the power source is selected so that magnetic flux is concentrated in susceptor 14 to inductively heat the susceptor at a susceptor heating high frequency. The depth that the flux field (and induced eddy current) penetrates into the susceptor is determined by the output frequency, F, of the power source, and the electrical conductivity and magnetic permeability of the susceptor in a particular application. The depth of induced eddy current penetration, $\Delta$, can be calculated from the equation:

$$\Delta = 503 \cdot \sqrt{\frac{\rho}{\mu \cdot F}} \qquad [Eq.\ 2]$$

where $\rho$ is the electrical resistivity of the susceptor material in $\Omega \cdot m$, and $\mu$ is the relative permeability of the material.

As heat from the susceptor transfers by conduction from the susceptor to the non-electrically conductive charge adjacent to the sides and bottom of the interior of the furnace, the melting charge pools to the bottom of the furnace.

Once melting of the charge commences and there is sufficient electrically conductive molten material within the furnace, output frequency, F, of the power source can be lowered to a molten material heating low frequency, as determined from the above Eq. (2) for a particular application, so that magnetic flux penetrates further into the interior of the furnace, rather than being concentrated in the susceptor, to couple with the molten material.

Typically after all of the charge in the furnace has melted, the process of degasification of impurities in the molten mass (melt) commences by injecting gas into porous material 16 through conduit 18, which percolates through the porous material and bubbles up through the melt in the furnace. This bubbling process reduces impurities in the melt, such as boron and phosphate, by forming volatile compounds of the impurities, which evaporate from the surface of the melt and can be drawn off by establishing a vacuum environment over the surface of the melt by using a sealing lid on the furnace or situating the entire furnace in a vacuum chamber. For boron, steam is used as the reacting gas for the reduction of boron impurities. For phosphorus, argon is used as the reacting gas at low pressure.

In the present invention the rate of degassing is enhanced by modulating the magnitude of the current supplied to the one or more induction coils, for example somewhere in the range from zero to 2 Hertz to propagate a sustained surface circular electromagnetically induced ripple/wave action as shown in FIG. 3 to increase the effective surface area of the melt in the furnace. Increasing the effective surface area of the melt in the furnace results in more rapid degassing of impurities since the magnitude of available surface area is directly proportional to the rate of degassing.

After degassing, the purified melt may be directionally, or otherwise solidified, in the furnace and removed therefrom as a solid ingot, or removed in the molten state, for example by pouring, bottom tap, or pressure pour.

In some example of the invention the one or more induction coils may comprise upper and lower induction coils. Current magnitude to the upper coil may be modulated to induce wave action while the current magnitude to the lower coil is kept constant.

The above examples of the invention have been provided merely for the purpose of explanation and are in no way to be construed as limiting of the present invention. While the invention has been described with reference to various embodiments, the words used herein are words of description and illustration, rather than words of limitations. Although the invention has been described herein with reference to particular means, materials and embodiments, the invention is not intended to be limited to the particulars disclosed herein; rather, the invention extends to all functionally equivalent structures, methods and uses. Those skilled in the art, having the benefit of the teachings of this specification, may effect numerous modifications thereto, and changes may be made without departing from the scope of the invention in its aspects.

The invention claimed is:

1. A method of melting and purifying a composition non-electrically conductive in a solid state and electrically conductive in a molten state, the method comprising:
   depositing a charge of the composition in the solid state in a crucible at least partially lined with a susceptor material;
   melting the charge of the composition by inductive heating of the susceptor material from a susceptor heating magnetic flux established by the flow of a susceptor heating high frequency current in at least two induction coils surrounding the exterior height of the crucible, and from a molten material heating magnetic flux established by the flow of a molten material heating low frequency current in the at least two induction coils subsequent to melting the charge to form a molten mass in the crucible, the susceptor heating high frequency current and the molten material heating low frequency current supplied from an alternating current power source;
   containing the molten mass in a vacuum environment;
   supplying one or more reaction gases to the bottom of the molten mass for reaction with one or more impurities in the molten mass to form one or more gas reaction impurities while supplying a modulating low frequency current to the uppermost one of the at least two induction coils from the alternating current power source to establish an electromagnetic wave action at the surface of the molten mass and the molten material heating low frequency current is supplied to the remaining of the at least two induction coils below the uppermost one of the at least two induction coils from the alternating current power source; and
   extracting the one or more gas reaction impurities from the vacuum environment.

2. The method of claim 1 further comprising the step of extending the at least two induction coils around the exterior height of the crucible at least from the top of a fill height of the crucible to at least 25 percent of the fill height below a bottom susceptor material of the susceptor material, the bottom susceptor material disposed in the bottom of the crucible.

3. The method of claim 2 further comprising the step of forming the molten mass in the crucible to at least a cylindrical volume with a diameter to height ratio of at least 8 to 1.

4. The method of claim 1 wherein supplying the modulating low frequency current further comprises modulating the modulating low frequency current between zero and 2 Hertz.

5. A method of melting and purifying a silicon composition, the method comprising:
   depositing a charge of the silicon composition in a solid state in a crucible at least partially lined with a susceptor material;
   melting the charge by inductive heating of the susceptor material from a susceptor heating magnetic flux established by the flow of a susceptor heating high frequency current in at least two induction coils surrounding the exterior height of the crucible, and from a molten material heating magnetic flux established by the flow of a molten material heating low frequency current in the at least two induction coils subsequent to melting the charge to form a molten silicon mass in the crucible, the susceptor heating high frequency current and the molten material low frequency current supplied from an alternating current power source;
   containing the molten silicon mass in a vacuum environment;
   supplying one or more reaction gases to the bottom of the molten silicon mass for reaction with one or more impurities in the molten silicon mass to form one or more gas reaction impurities while supplying a modulating low frequency current to the uppermost one of the at least two induction coils from the alternating current power source to establish an electromagnetic wave action at the surface of the molten silicon mass in the crucible and the molten material heating low frequency current is supplied to the remaining of the at least two induction coils below the uppermost one of the at least two induction coils from the alternating current power source; and
   extracting the one or more gas reaction impurities from the vacuum environment.

6. The method of claim 5 further comprising the step of forming the molten silicon mass in the crucible to at least a cylindrical volume with a diameter to height ratio of at least 8 to 1.

7. The method of claim 5 further comprising the step of propagating a sustained surface circular electromagnetically induced ripple/wave action by modulating the modulating low frequency current between zero and 2 Hertz.

8. The method of claim 5 further comprising the steps of:
   forming the crucible to hold the cylindrical volume of molten silicon mass with a diameter to height ratio of at least 8 to 1;
   forming the remaining of the at least two induction coils from a lower induction coil so that the lower induction coil extends at least 25 percent below a bottom susceptor material of the susceptor material, the bottom susceptor material disposed in the bottom of the crucible and the uppermost one of the at least two induction coils extends above the lower induction coil to the top of the fill height of the crucible;
   supplying the modulating low frequency current to the uppermost one of the at least two induction coils to establish the electromagnetic wave action at the surface of the molten silicon mass at the top of the fill height by modulating the modulating low frequency current between zero and 2 Hertz; and
   maintaining the flow of the molten material heating low frequency current in the lower induction coil.

9. A method of melting and purifying a composition non-electrically conductive in the solid state and electrically conductive in the molten state, the method comprising:
   forming a crucible at least partially lined with a susceptor material so that the crucible holds a cylindrical volume of a molten mass with a diameter to height ratio of at least 8 to 1;

forming an upper and lower induction coil around the exterior of the height of the crucible so that the lower induction coil extends at least 25 percent of a fill height of the crucible below a bottom susceptor material of the susceptor material, the bottom susceptor material disposed in the bottom of the crucible, and the upper induction coil extends above the lower induction coil to at least the top of the fill height;

depositing a charge of the composition in the solid state in the crucible;

melting the charge of the composition by inductive heating of the susceptor material from a susceptor heating magnetic flux established by the flow of a susceptor heating high frequency current in the upper and lower induction coils, and from a molten material heating magnetic flux established by the flow of a molten material heating low frequency current in the upper and lower induction coils subsequent to melting the charge to form a molten mass in the crucible, the susceptor heating frequency current and the molten material heating low frequency current supplied from an alternating current power source;

containing the molten mass in a vacuum environment;

supplying one or more reaction gases to the bottom of the molten mass for reaction with one or more impurities in the molten mass to form one or more gas reaction impurities while supplying a modulating low frequency current from the alternating current power source to the upper induction coil to establish an electromagnetic wave action at the surface of the molten mass by modulating the modulating low frequency current between zero and 2 Hertz;

maintaining the flow of the molten material heating low frequency current in the lower induction coil; and extracting the one or more gas reaction impurities from the vacuum environment.

* * * * *